United States Patent [19]

Kokai et al.

[11] Patent Number: 4,621,794
[45] Date of Patent: Nov. 11, 1986

[54] APPARATUS FOR PRODUCING A GRAIN-ORIENTED ELECTROMAGNETIC STEEL STRIP OR SHEET

[75] Inventors: Katsuaki Kokai; Takeo Ohta, both of Kitakyusyushi, Japan

[73] Assignee: Nippon Steel Corporation, Tokyo, Japan

[21] Appl. No.: 636,662

[22] Filed: Aug. 1, 1984

Related U.S. Application Data

[62] Division of Ser. No. 435,457, Oct. 4, 1982, Pat. No. 4,500,366.

[51] Int. Cl.$^4$ .............................................. C21D 9/663
[52] U.S. Cl. ................................... 266/256; 266/262; 432/254.2
[58] Field of Search ................... 432/206, 254.2; 266/255, 253, 256, 262–264

[56] References Cited

U.S. PATENT DOCUMENTS

| | | | |
|---|---|---|---|
| 1,977,399 | 10/1934 | Northrup | 266/256 |
| 2,081,990 | 1/1937 | Eberwein | 266/251 |
| 2,454,253 | 11/1948 | Kniveton | 266/262 |
| 2,869,856 | 1/1959 | Greene | 266/253 |
| 3,188,068 | 6/1965 | Schmidt | 266/256 |
| 4,147,506 | 4/1979 | Southern et al. | 432/148 |
| 4,310,302 | 1/1982 | Thekdi et al. | 432/205 |
| 4,415,145 | 11/1983 | Herdieckerhoft | 266/262 |

Primary Examiner—Christopher W. Brody
Attorney, Agent, or Firm—Wenderoth, Lind & Ponack

[57] ABSTRACT

In a process for producing a grain-oriented electromagnetic steel strip or sheet by annealing, for primary recrystallization, a cold rolled electromagnetic steel strip or sheet having a final thickness, and subjecting said strip or sheet to secondary recrystallization annealing by heating it so that any portion of said strip or sheet along its width or length may pass through the boundary between the temperature ranges for primary recrystallization and secondary recrystallization with a predetermined temperature gradient, the improvement wherein said secondary recrystallization annealing is achieved by applying a principal supply of heat to at least one end of a coil of said strip or a stack or a plurality of said sheets.

3 Claims, 28 Drawing Figures

APPARATUS FOR PRODUCING A GRAIN-ORIENTED ELECTROMAGNETIC STEEL STRIP OR SHEET

This application is a divisional of application Ser. No. 435,457 filed Oct. 4, 1982, now U.S. Pat. No. 4,500,366 issued Feb. 19, 1985.

BACKGROUND OF THE INVENTION

1. Field of the Invention

This invention relates to a process for producing a grain-oriented electromagnetic steel strip or sheet having a grain orientation of <100> which is easily magnetizable in the rolling direction. More particularly, it is concerned with a method of heating an electromagnetic steel strip or sheet which has been cold rolled to a final thickness and annealed for primary recrystallization, for performing finish or secondary recrystallization annealing to produce a grain-oriented electromagnetic steel strip or sheet.

2. Description of the Prior Art

A box type annealing furnace is usually used for finish annealing a silicon steel sheet in the form of a coil to produce a grain-oriented silicon steel sheet. Referring to FIG. 1, this furnace comprises a base plate 2 on which a coil 1 of silicon steel sheet to be finish annealed is placed, an inner cover 3 surrounding the coil 1, an outer cover 4 surrounding the inner cover 3, and a number of electric heaters, i.e., a heater 5 provided on the ceiling of the outer cover 4, a heater 6 provided on its sidewall and a heater 7 provided under the base plate 2. All of these heaters are placed in operation simultaneously to supply heat to the coil 1 in all directions to heat the entire coil 1 relatively uniformly. FIG. 2 shows the temperature distribution determined at certain intervals of time between the upper and lower ends of the coil 1 annealed in such, the box type furnace, i.e., a temperature distribution along the one-dot chain line in FIG. 1. As is obvious from FIG. 2, box annealing provides a relatively uniform temperature distribution between the upper and lower ends of the coil, i.e., along the width of the sheet, with a relatively small temperature gradient if any.

The magnetic properties of a grain-oriented silicon steel sheet produced by such relatively uniform heating in a box type annealing furnace, and particularly its flux density, have been examined. As a result, it has been found that even a silicon steel sheet known as having a high flux density has a B8 value of, say, only 1.92T which is far below the theoretically maximum B8 value of about 2.04T for an ordinary 3% silicon steel sheet, and requires drastic improvement.

Japanese Patent Application No. 20154/1981 proposes a process for producing a grain-oriented silicon steel sheet having a high flux density. According to this process, a cold rolled silicon steel sheet having a final thickness, and annealed for primary recrystallization, is annealed for finish recrystallization with a temperature gradient of at least 2° C. per centimeter of the width or length of the sheet in a boundary temperature range between the primary and secondary recrystallization temperatures. In other words, this Japanese application teaches the advisability of maintaining a certain temperature gradient per unit width or length of a particular portion of a sheet passing through a specific temperature range of, say, 820° C. to 1,020° C. when it is heated to a finish annealing temperature for secondary recrystallization. A particular temperature in the aforesaid specific temperature range is called a specific temperature $\theta_o$.

SUMMARY OF THE INVENTION

It is an object of this invention to provide an industrially controllable and accurate process for heating a cold rolled electromagnetic steel strip or sheet having a final thickness and which has been annealed for primary recrystallization, for performing finish annealing to produce a grain-oriented electromagnetic steel strip or sheet.

According to this invention, the annealing of the strip or sheet for secondary recrystallization is carried out by applying a principal supply of heat to one or both of the top and bottom ends of a coil of the strip, and one or both of the opposite ends of a stack of sheets.

Other objects and advantages of this invention will become apparent from the following detailed description, and the accompanying drawings.

DETAILED DESCRIPTION OF THE INVENTION

Figure 1:
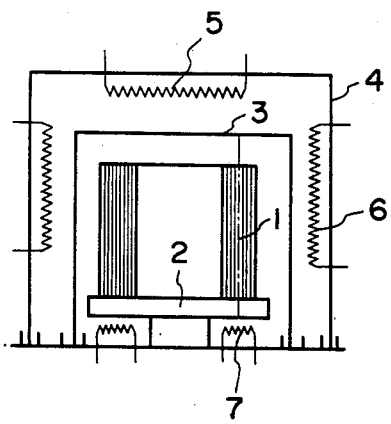
FIG. 1 is a schematic vertical sectional view of a known box type furnace used for the finish annealing of a silicon steel strip.
Figure 2:
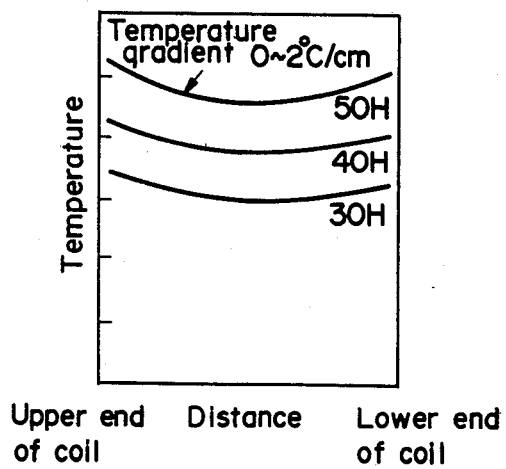
FIG. 2 is a graph showing a temperature distribution along the width of the strip annealed in the furnace of FIG. 1.

The invention will now be described in detail with reference to several examples of application directed to a coil of a steel strip, though it is equally applicable to a stack of steel sheets.

The basic concept of this invention will be described with reference to FIG. 3 which is a fragmentary perspective view, partly in section, of a box type annealing furnace. The furnace comprises a pair of ceramic wool or like heat insulating members 31 covering the inner and outer peripheral surfaces of a coil 32 of steel strip, an inner cover 34, a base plate 36, a heating element 33 disposed above the inner cover 34, and an outer cover 35. No insulating material is provided for the upper or lower end of the coil 32. If the coil 32 is heated at its upper end by the heating element 33, it obtains along its height, i.e. the width of the strip, a temperature distribution which varies with the lapse of time as shown in FIG. 4. The temperature difference along the wall thickness of the coil is negligible, if its inner and outer peripheral surfaces are satisfactorily insulated.

Figure 4:
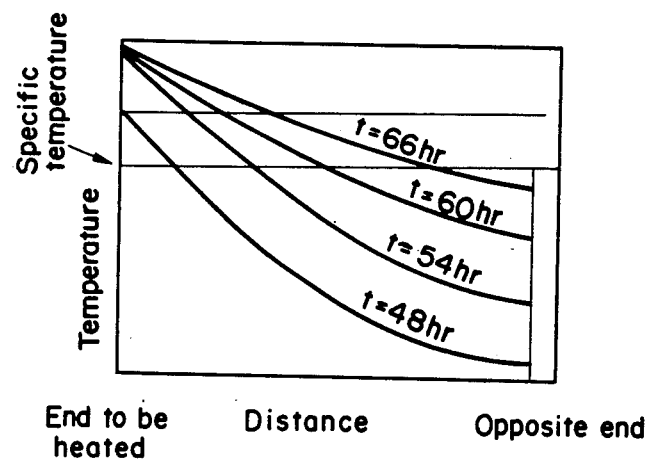
FIG. 4 is a graph showing, in relation to time, a temperature distribution along the width of a steel strip heated in the form of a coil by application of heat to one end of the coil.
Figure 5:
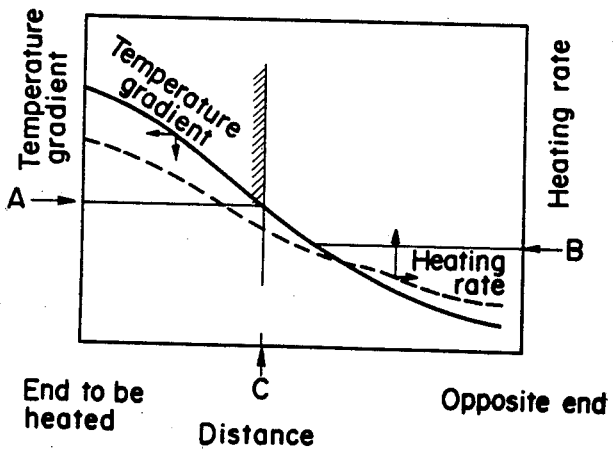
FIG. 5 is a graph showing a temperature gradient for the width of the strip at a specific temperature and a heating rate which have been derived from the temperature distribution curves of FIG. 4.

FIG. 5 is a graph derived from FIG. 4, and showing a temperature gradient and a heating rate along the height of the coil at a specific temperature. It follows from FIG. 5 that if a specific temperature gradient has a lower limit indicated by an arrow A, while a specific heating rate has a lower limit indicated by an arrow B, an area indicated by an arrow C and the slanting lines defines a boundary for the coil height or strip width which satisfies both of the specific ranges of the temperature gradient and the heating rate.

Although the heating process of this invention can be carried out in various ways, a high degree of accuracy can be achieved if the process is carried out as hereinafter described.

Figure 3:
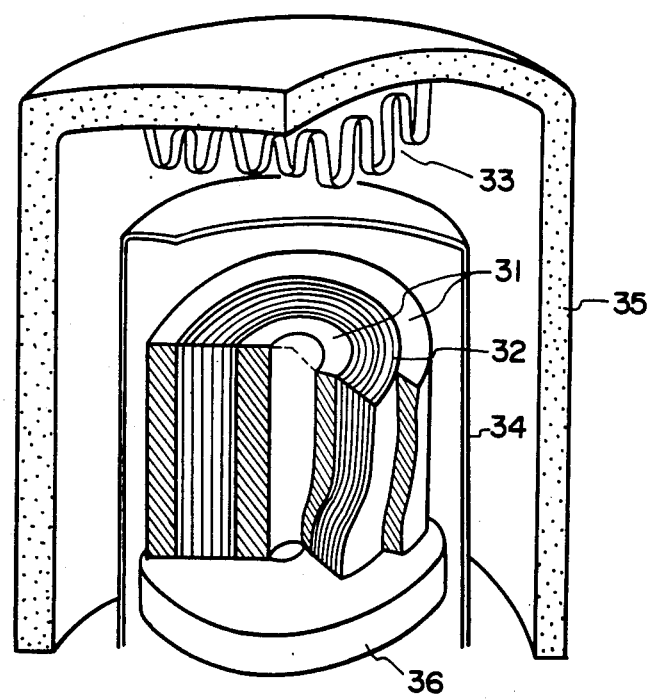
FIG. 3 is a view illustrating the basic concept of this invention.
Figure 6:
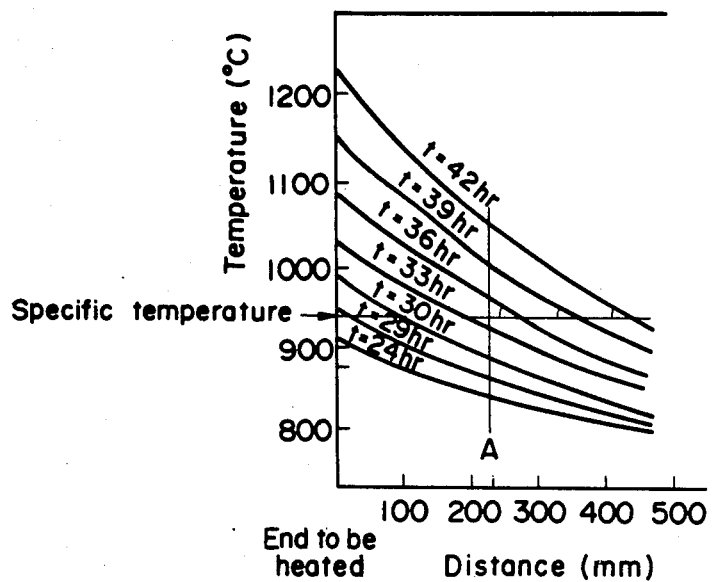
FIG. 6 is a graph showing changes in a temperature distribution for a constant temperature gradient along the entire strip width at a specific temperature.

If the temperature of that end of the coil 32 at which it is heated in the furnace of FIG. 3 is raised in a specific pattern, it is possible to ensure that every portion of the coil along its height will pass through a specific temperature, while maintaining a substantially constant temperature gradient and a substantially constant heating rate irrespective of its distance from that end of the coil, as shown in FIG. 6. FIG. 6 indicates changes with the lapse of time in the temperature distribution along the height of a coil of a strip having a large width when it is heated at one end in accordance with a specific heating pattern shown in FIG. 7, and depending on the physical properties of the coil.

Figure 7:
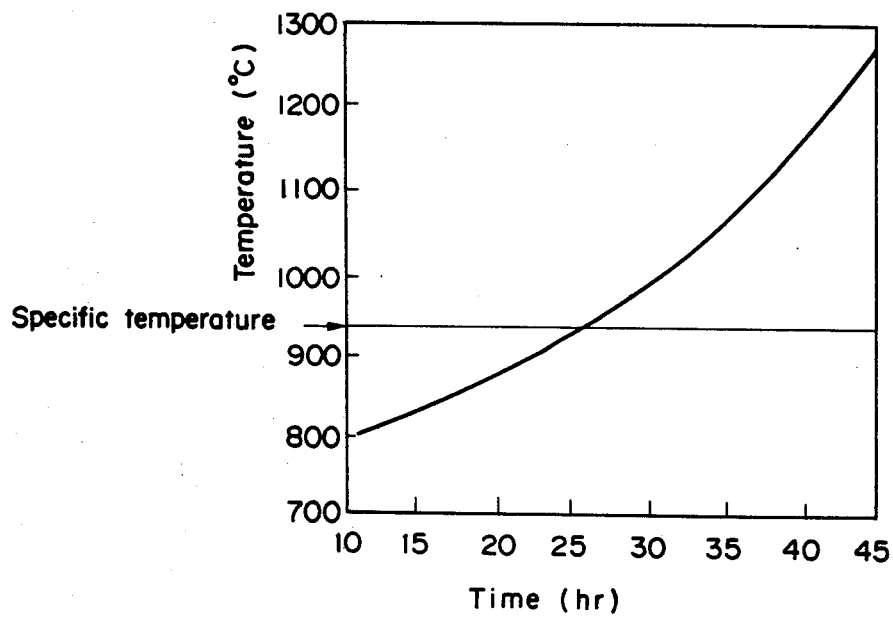
FIG. 7 is a graph showing a heating curve which may be employed to heat one end of the coil to achieve the temperature distribution of FIG. 6.
Figure 8:
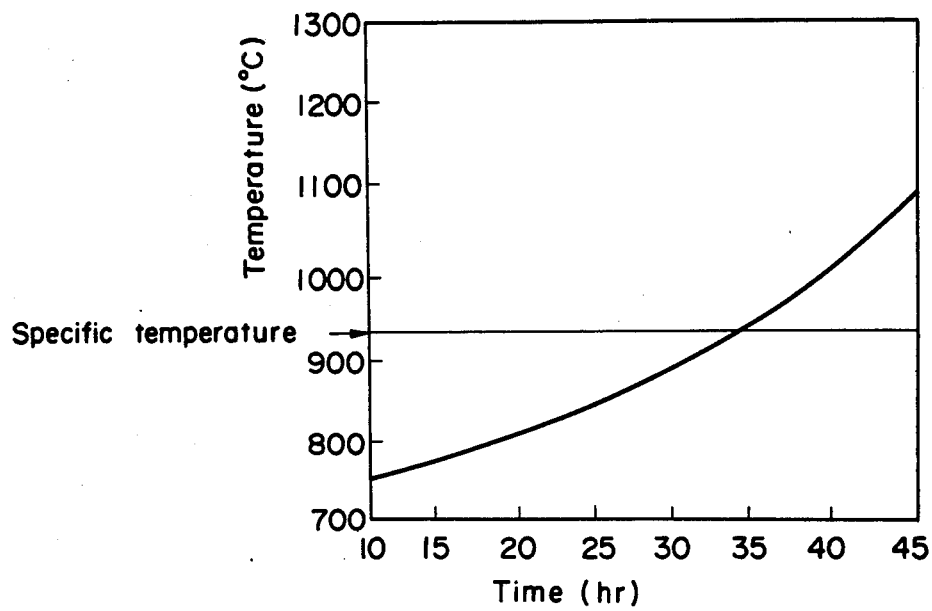
FIG. 8 is a graph showing a heating curve for the other end of the coil to achieve the temperature distribution of FIG. 6 on the vertical line A.

If the strip has a smaller width, for example, a width of 230 mm as indicated by a vertical line A in FIG. 6, and if the coil is heated at one end in accordance with the heating pattern of FIG. 7, the vertical line A indicates the various temperatures to which the other end of the coil is heated with the lapse of time. This variation in the temperature of the other end of the coil is shown by the curve in FIG. 8. Accordingly, it is possible to ensure that a strip having a width of 230 mm will pass accurately through a specific temperature along its entire width with a constant temperature gradient and a constant rate of temperature elevation, as is the case with a wider strip, if its coil is heated at one end in accordance with the pattern of FIG. 7, and heated or cooled so that the other end of the coil may be heated in accordance with the pattern of FIG. 8.

Figure 9:
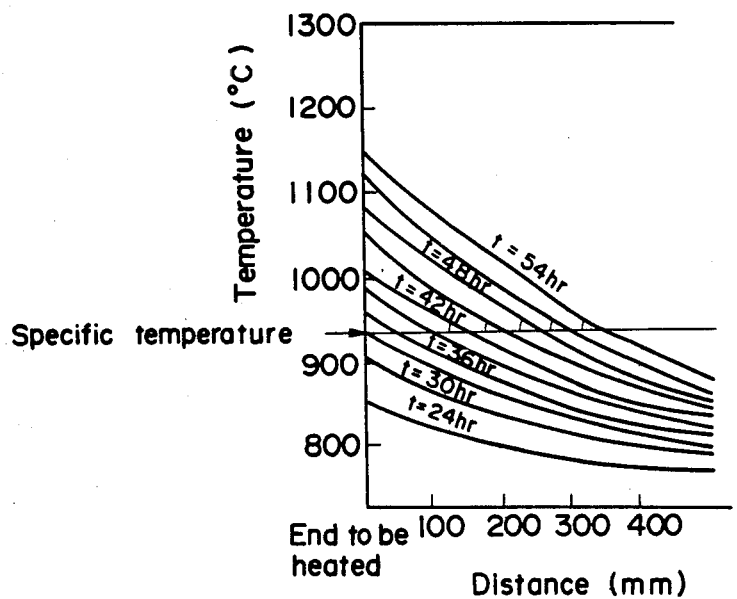
FIG. 9 is a graph showing changes in the temperature distribution noted along the strip width when a lower temperature is employed to start heating one end of the coil.

FIG. 9 shows changes which arise in the temperature distribution along the height of a coil with the lapse of time in the event a lower temperature is employed to start heating the coil at one end. Although the coil is heated under the same conditions as in FIG. 6, it has a lower rate of temperature elevation. Accordingly, it is possible to control the rate of temperature elevation in a coil by varying the temperature at which the heating of the coil is started. This control is available for any heating pattern employed for heating the coil at one end.

Figure 10:
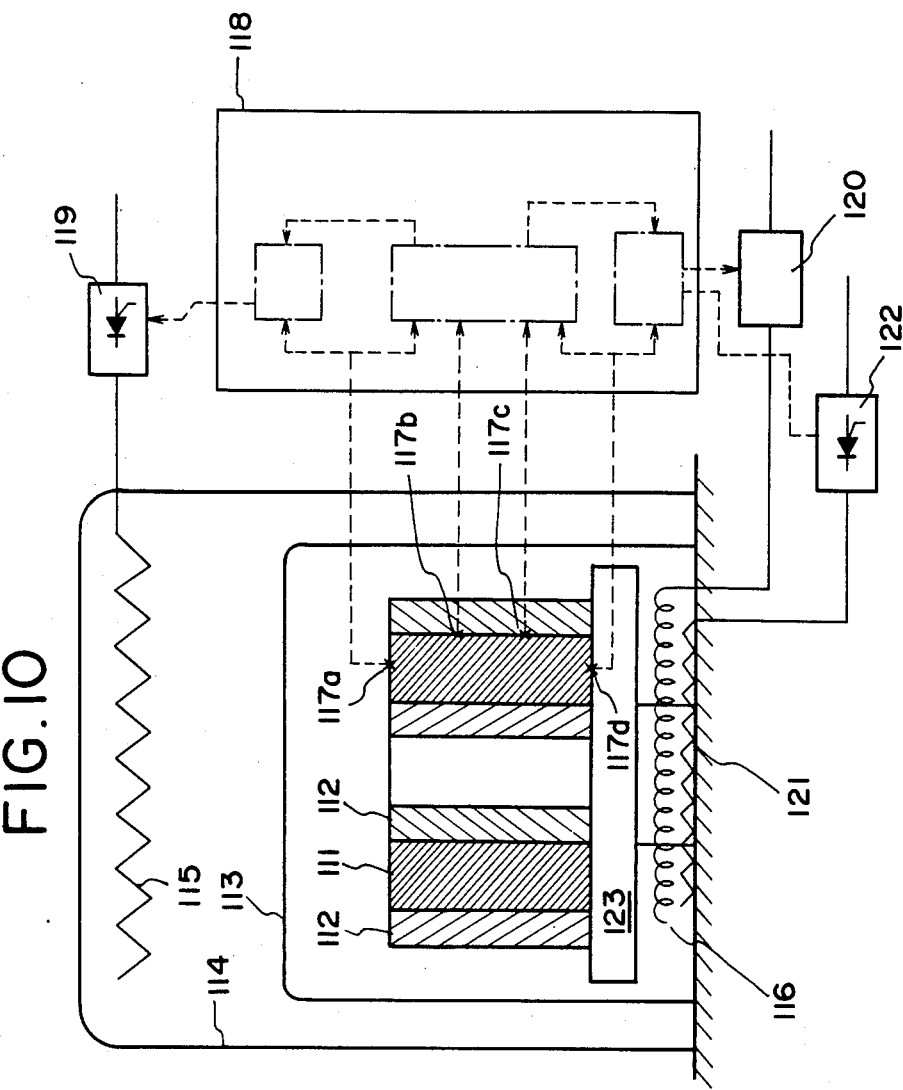
FIG. 10 is a view illustrating an apparatus for carrying out a process embodying this invention.

Referring now to FIG. 10, there is shown by way of example an apparatus which can be employed for carrying out a process embodying this invention. The apparatus comprises a pair of ceramic wool or other heat insulating members 112 covering the inner and outer surfaces of a coil 111 of a metal strip, an inner cover 113, a furnace body 114, an upper heating element 115, such as an electric resistance coil, a base plate 123 having a high degree of thermal conductivity, a cooling pipe 116 provided below the base plate 123, temperature detectors 117a, 117d, 117b and 117c provided for measuring the temperature of the coil 111 at both ends thereof and at intermediate points along its height, a coil temperature control system 118, a device 119 for controlling the supply of power to the heating element 115, a device 120 for controlling the flow rate of a cooling medium, a lower heating element 121, such as an electric resistance coil, provided below the cooling pipe 116, and a device 122 for controlling the supply of power to the heating element 121.

The coil 111 is mainly heated by the upper heating element 115 which heats the upper end of the coil 111. The temperature of the coil 111 at the upper end thereof is measured by the temperature detector 117a, and the supply of power to the heating element 115 is controlled by the device 119 so that the temperature of the coil at its upper end may rise in accordance with the pattern shown in FIG. 7. The temperature of the coil at its lower end is measured by the temperature detector 117d, and its control is effected by controlling the supply of power to the lower heating element 121 by means of the device 122, or by controlling the supply of a cooling medium to the cooling pipe 116 by means of the device 120, so that it may follow the pattern shown in FIG. 8. The temperatures of the coil 111 at the intermediate points along its height are measured by the temperature detectors 117b and 117c, and utilized to correct the heating patterns for the upper and lower ends of the coil 111 so that they may coincide with the patterns shown in FIGS. 7 and 8, respectively, to enable proper heat treatment of the coil 111. These control operations may all be carried out in accordance with known techniques by the control system 118 which is composed of control computers.

According to the process hereinabove described, the electromagnetic steel strip or sheet to be finish annealed is heated in such a manner that every widthwise portion of the strip, or every widthwise or lengthwise portion of the sheet, will pass through the boundary region between the temperature ranges for its primary and secondary recrystallization with a predetermined temperature gradient, whereby the growth of grains of secondary recrystallization enables the production of a grain-oriented electromagnetic steel strip or sheet having a high flux density. There is, however, a certain limitation to the width of the strip or sheet which can be treated by this process, since heat is mainly supplied to one end of a coiled of strip or a stack of sheets. If the width of the strip or sheet exceeds a certain level, it is difficult to obtain substantially uniform magnetic properties along the entire width or length of the strip or sheet.

This problem is solved by a second aspect of this invention. According to this aspect, additional heat is supplied to the inner and outer surfaces of a coiled of strip, or the upper and lower surfaces of a stack of sheets, so that heat may be supplied to an enlarged area extending from one end of the coil or stack at which a principal supply of heat is furnished thereto, to the other end.

The second aspect of this invention will now be described in further detail by way of example with reference to the drawings.

EXAMPLE 1

Figure 11:
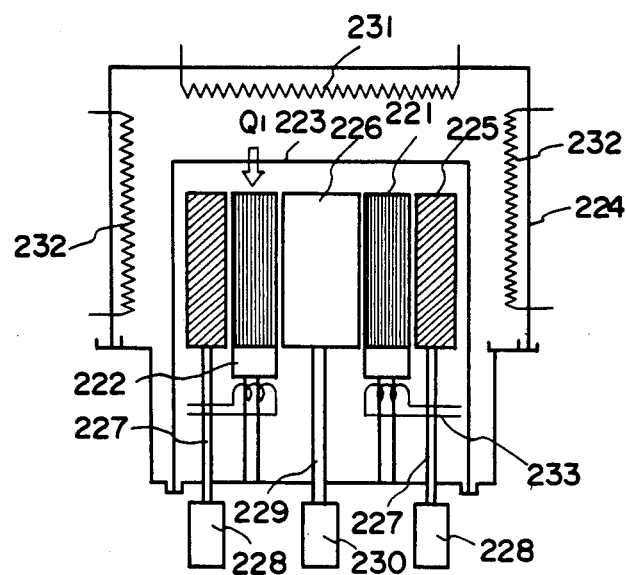
FIG. 11 is a view showing a modified form of the apparatus of FIG. 10.

Referring to FIG. 11, a coil 221 of electromagnetic steel strip is placed on a base plate 222, and a cylindrical member 226 of heat insulating material is inserted into the coil 221, while an annular member 225 of heat insulating material is disposed about the coil 221. The cylindrical heat insulating material 226 has an outside diameter which is slightly smaller than the inside diameter of the coil so that it may be movable axially of the coil. The annular heat insulating material 225 has an inside diameter which is slightly larger than the outside diameter of the coil so that it may also be movable axially of the coil. The heat insulating material 226 has a lower end connected by a connecting rod 229 to a drive unit 230, such as a hydraulic piston. The heat insulating material 225 has a lower end connected by connecting rods 227 to drive units 228, such as hydraulic pistons. The drive units 228 and 230 enable the vertical movement of the heat insulating members 225 and 226, respectively, along the axis of the coil. The apparatus of FIG. 11 further includes an inner cover 223, an outer cover 224, an electric heater or burner 231 provided under the ceiling of the outer cover 224, electric heaters or burners 232 provided on the sidewall of the outer cover 224, and a cooling device 233.

The coil 221 has an upper end positioned flush with the upper ends of the heat insulating members 225 and 226 as shown in FIG. 11, or the upper ends of the members 225 and 226 are so positioned as to project beyond the upper end of the coil 221. A first supply of heat $Q_1$ is applied to the upper end of the coil 221 by the ceiling heater 231. The presence of the heat insulating members 225 and 226 ensures that only a very small or negligible amount of heat will be transferred along the wall thickness of the coil 221, i.e., in a horizontal direction in FIG. 11. The heat $Q_1$ is, therefore, supplied to the coil 221 at its upper end alone, and flows in a single direction from the upper to lower end of the coil. This period of heating is called the period of unidirectional heating. When the period of unidirectional heating begins, the coil 221 does not need to be at ordinary room temperature, but it is possible to preheat the coil to any temperature that is lower than a specific temperature range.

Figure 12:
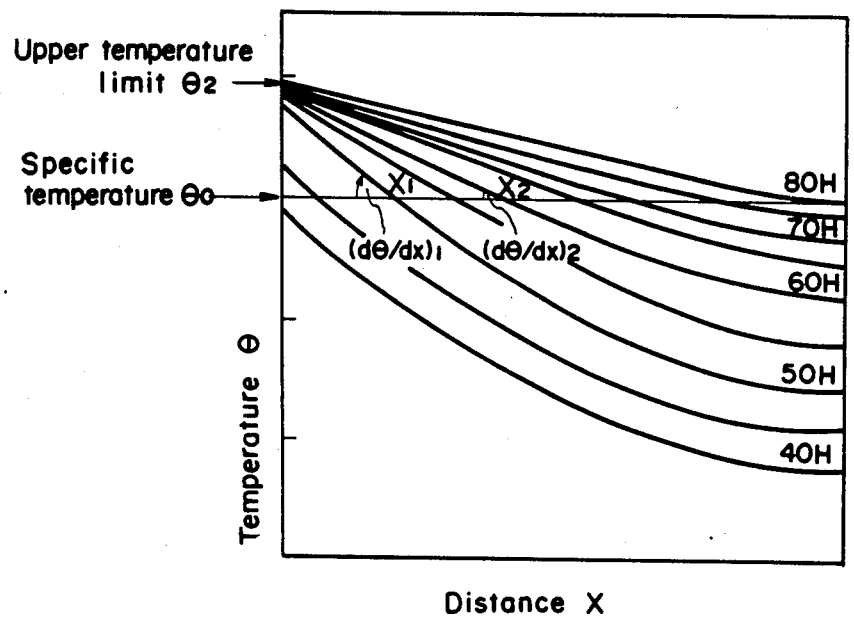
FIG. 12 is a graph showing the temperature distribution along the width of a strip heated in a single direction in accordance with the process illustrated in FIG. 10.

During the period of unidirectional heating, the upper end portion of the coil 221 is heated more rapidly than any other portion thereof by the heat $Q_1$, and therefore, a temperature gradient develops along the height of the coil 221, or the strip. As the heating of the coil is continued, the specific temperature range gradually moves down toward the lower end of the coil, and the temperature of the coil as a whole is gradually elevated. This is shown in FIG. 12 by a number of curves indicating the changes which occur to the temperature distribution along the height of the coil with the lapse of time. As is obvious from FIG. 12, the coil has a temperature gradient during the period of unidirectional heating. There is, however, a limitation to the temperature of the upper end of the coil, since it is necessary to avoid deterioration of the vitreous film of the steel strip or sheet surfaces. It is necessary to set an upper temperature limit $\theta_2$ beyond which the upper end of the coil should not be heated. If the unidirectional heating of the coil is continued after the upper temperature limit $\theta_2$ has been reached, the coil has, for example, a temperature distribution along its height as shown by a curve 60H in FIG. 12, which is a curve indicating the temperature distribution after 60 hours of heating. The temperature gradient $(d\theta/dx)_2$ at the point $X_2$ where the curve 60H passes the specific temperature $\theta_o$ is by far smaller than the temperature gradient $(d\theta/dx)_1$ at the point $X_1$ where the curve 50H, which is a curve for the temperature distribution obtained when the upper end of the coil is still at a temperature below the upper temperature limit $\theta_2$, passes the specific temperature $\theta_o$. It is a temperature gradient which disables the realization of any desired magnetic properties.

Figure 13:
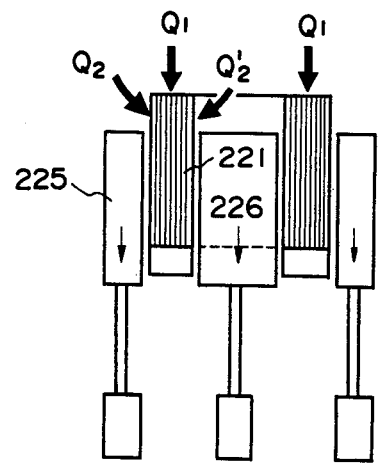
FIG. 13 is a view illustrating the heating of the inner and outer sides of the coil according to the process illustrated in FIG. 10.

It is, therefore, necessary to lower the heat insulating members 225 and 226 to expose the inner and outer surfaces of the coil 221 in the vicinity of its upper end as shown in FIG. 13, before the coil shows a temperature distribution as indicated by the curve 60H. In addition to the heat $Q_1$, a second supply of heat $Q_2$ and $Q_2'$ is applied to the exposed inner and outer surface portions of the coil 221 as shown in FIG. 13. Those portions rise rapidly in temperature, and show a temperature distribution as indicated by a curve B in FIG. 14, while a curve B' indicates a temperature distribution obtained by continuation of only unidirectional heating. The temperature gradient $(d\theta/dx)_B$ defined by the curve B passing the specific temperature $\theta_o$ is larger than the gradient $(d\theta/dx)_{B'}$ defined by the curve B', and is obviously useful for improving the magnetic properties of the steel.

With the lapse of time, the heat insulating members 225 and 226 are gradually lowered to a further extent to enlarge the exposed inner and outer surface portions of the coil to which the second supply of heat is applied, so that the temperature of those portions may be raised rapidly. As the members 225 and 226 are lowered, therefore, the coil has along its height a temperature distribution as shown by a curve C, D or E which is similar in shape to the curve B. If those portions to which the second supply of heat are not enlarged, the coil has a temperature distribution curve C' or D' which defines a smaller temperature gradient at a point where it passes the specific temperature $\theta_o$, while the curve C, D or E defines a large temperature gradient. The period during which the second supply of heat is applied as shown in FIG. 13 will hereinafter be called the period of lateral heating.

Figure 14:
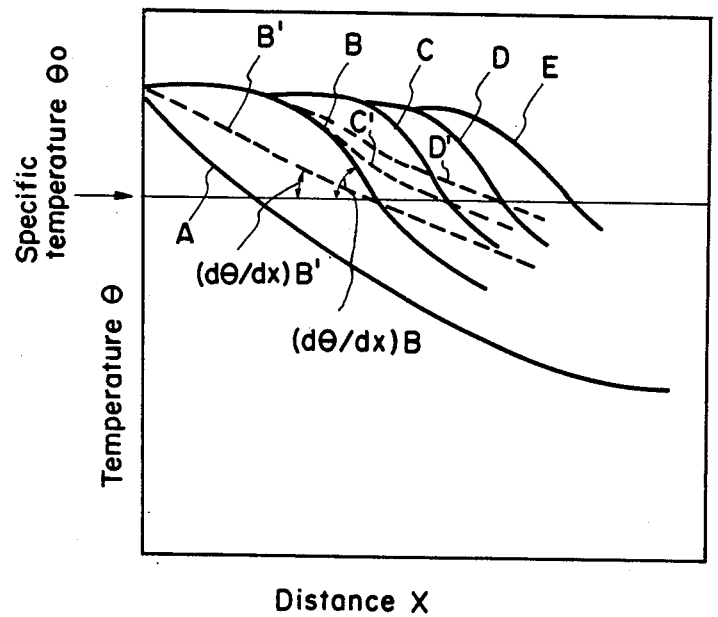
FIG. 14 is a graph showing the temperature distribution along the strip width during the heating of the inner and outer sides of the coil.

During the period of lateral heating, it is possible to obtain along the entire height of the coil a temperature distribution curve having a definite shape similar to the curve B, C, D or E in FIG. 14, irrespective of the lapse of time. Accordingly, it is possible to achieve a substantially uniform temperature gradient at the specific temperature $\theta_o$, and therefore, obtain the desired magnetic properties along the entire height of the coil.

Figure 15:
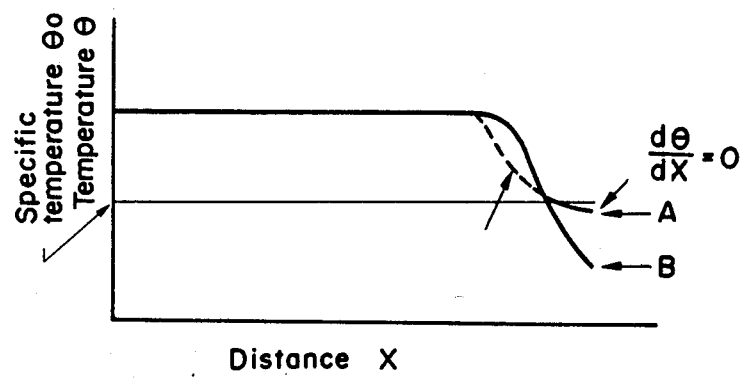
FIG. 15 is a graph illustrating the effect obtained by cooling the base plate in the apparatus of FIG. 11.

The cooling device 233 makes it possible to obtain any desired temperature gradient more effectively. The cooling device may, for example, comprise a pipe into which $N_2$ gas is introduced. If no such cooling is performed, but the base plate is insulated against heat, there theoretically results a temperature gradient $d\theta/dx$ of 0 as shown by curve A in FIG. 15. This may result in the loss of the effect expected from this invention. On the other hand, the cooling of the base plate 222 gives rise to a temperature gradient as shown by curve B in FIG. 15, and thereby ensures the greater applicability of this invention.

EXAMPLE 2

Figure 16:
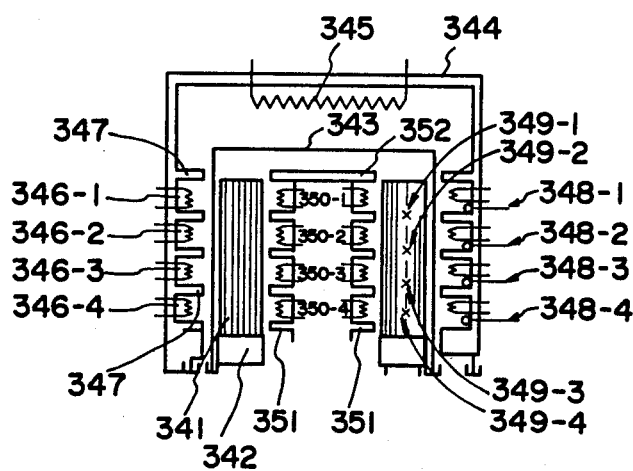
FIG. 16 is a view illustrating a second embodiment of this invention.

Referring to FIG. 16, there is shown a furnace comprising a base plate 342 on which a coil 341 of a steel strip is placed, an inner cover 343, an outer cover 344, and a heater 345, such as an electric heater or fuel-fired burner, provided under the ceiling of the outer cover 344. The inner cover 343 is spaced apart from the outer peripheral surface of the coil 341 only by a small distance. A group of side heaters 346-1 to 346-4 are provided in the space between the sidewalls of the inner and outer covers 343 and 344, and spaced apart from one another by heat insulating walls 347. The side heaters face the outer peripheral surface of the coil 341 along its entire height. Any other number of such outer surface heaters can be employed, if at least two are provided. A plurality of inner surface heaters 350-1 to 350-4 are provided in the central hollow space of the coil, and spaced apart from one another by heat insulating walls 351. Any other number of such inner surface heaters can be employed, if at least two are provided.

Thermocouples 348-1 to 348-4 are provided for the outer surface heaters, respectively, to detect their temperatures and transmit the corresponding temperature signals to a temperature control system which controls the temperatures of the heaters. Thermocouples 349-1 to 349-4 are provided for the coil 341, and aligned horizontally with the thermocouples 348-1 to 348-4 for the outer surface heaters. No such thermocouple need be provided for the coil 341 if separate means are provided for predicting the coil temperature, for example, by numerical operations employing an electronic computer. The coil temperature as actually detected, and the predicted coil temperature will both be referred to as the coil temperature.

A first supply of heat is applied by the ceiling heater 345 to the coil 341 at its upper end. The central hollow space of the coil 341 is closed by a heat insulating plate 352, and only a narrow gap spaces the outer peripheral surface of the coil 341 apart from the sidewalls of the inner and outer covers 343 and 344. Accordingly, only a small proportion of the heat supplied from the ceiling heater 345 is transmitted along the wall thickness of the coil 341, and the coil is heated unidirectionally as shown in FIG. 12. If during the period of such unidirectional heating, the coil and heater temperatures are controlled to eliminate any difference in temperature between the coil and the heater, the transfer of heat across the wall of the coil is further decreased, and unidirectional heating is enhanced with a resultant gradient in the temperature distribution along the height of the coil. If the thermocouple 349-1 has indicated a coil temperature exceeding the specific temperature $\theta_o$, the temperatures of the corresponding heaters 346-1 and 350-1 are so controlled as to exceed the coil temperature detected by the thermocouple 349-1. Then, a second supply of heat is applied by the heaters 346-1 and 350-1 to the coil portion corresponding to the thermocouple 349-1. This is lateral surface heating as described in EXAMPLE 1. This lateral heating brings about a sharp rise in temperature at 349-1, while only a slight increase in temperature takes place at 349-2 to 349-4, since the temperature of the corresponding heaters is so controlled as to be equal to the coil temperature. Accordingly, a difference arises in the rate of temperature between the upper and lower ends of the coil, and produces a temperature gradient along the height of the coil. The corresponding temperature distribution is shown by the curve B in FIG. 14.

The temperature distribution obtained when no such lateral heating is performed is shown by the curve B' in FIG. 14. The temperature gradient $(d\theta/dx)_B$ obtained at the specific temperature $\theta_o$ when lateral heating is performed is greater than the temperature gradient $(d\theta/dx)_{B'}$ achieved when no lateral heating is performed, and improves the magnetic properties of the strip.

Then, if the coil temperature detected at 349-2 has reached the specific temperature $\theta_o$, the temperature of the heaters 346-2 and 350-2 is raised to heat the coil surfaces at 349-2. These laterally heated portions rise in temperature rapidly, and define a large temperature gradient from the lower portion of the coil. As the lateral heating of the coil gradually proceeds toward its lower end, the coil has a temperature distribution along its height as shown by the curve C, D or E in FIG. 14. As has been the case with EXAMPLE 1, therefore, it is possible to achieve a constant temperature gradient at the specific temperature $\theta_o$ along the entire height of the coil, and thereby obtain any desired magnetic properties for the entire coil.

EXAMPLE 3

Figure 17:
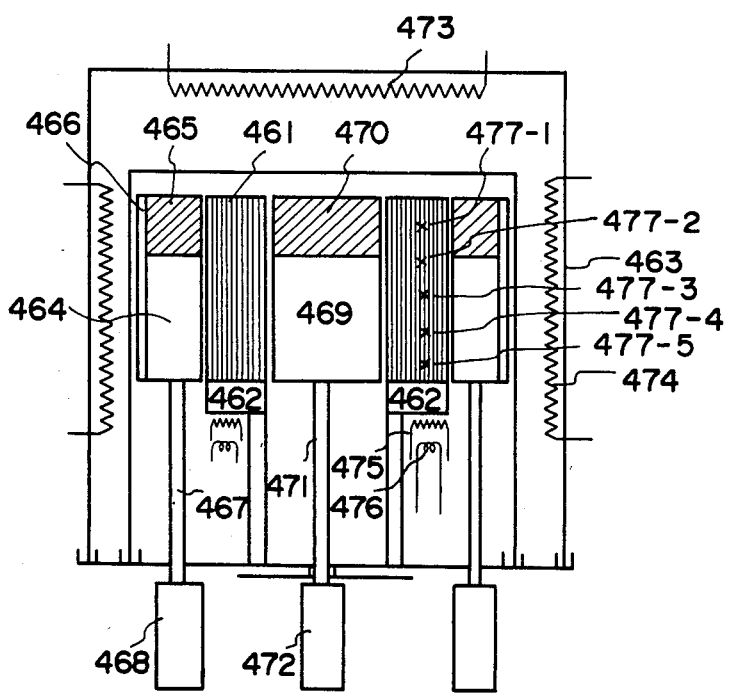
FIG. 17 is a view illustrating a third embodiment of this invention.
Figure 18:
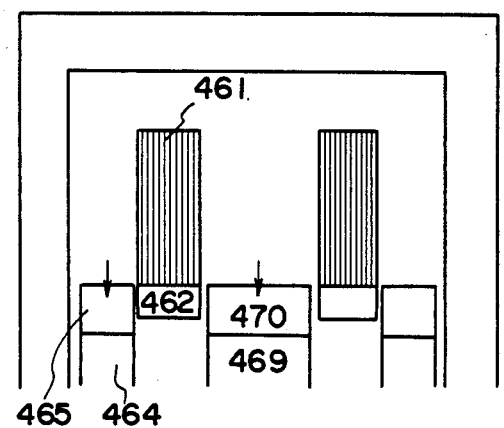
FIG. 18 is a view showing the lowered position of an annular member and a cylindrical member in the apparatus of FIG. 17.

Referring to FIG. 17, there are shown a coil of steel strip 461, a base plate 462 and an outer cover 463. An annular cooling chamber 464 is slightly radially spaced apart from the outer peripheral surface of the coil 461, and an annular member 465 of heat insulating material is provided on the cooling chamber 464. The cooling chamber 464 and the insulating material 465 form an integral annular structure completely surrounding the outer peripheral surface of the coil 461, and surrounded by a layer 466 of heat insulating material. The annular structure is connected to drive units 468, such as hydraulic pistons, by connecting rods 467, and is vertically movable axially of the coil 461. A cylindrical cooling chamber 469 is disposed in the central hollow space of the coil 461, slightly radially spaced apart from the inner peripheral surface of the coil, and movable vertically along the axis of the coil. A cylindrical member 470 of heat insulating material is provided on the cooling chamber 469, and forms an integral cylindrical structure therewith. This structure is connected by a connecting rod 471 to a drive unit 472, such as a hydraulic piston, and is vertically movable along the axis of the coil as shown in FIG. 18. A heater 473, such as an electric heater or fuel-fired burner, is provided under the ceiling of the outer cover 463, and a heater 474 is likewise provided on the sidewall thereof and faces the outer peripheral surface of the coil 461. A heater 475 is also provided below the base plate 462, and a cooling device 476, such as a cooling pipe, is disposed below the heater 475.

The coil 461 is first heated from ordinary room temperature to a level below the specific temperature $\theta_o$. The annular and cylindrical structures are lowered by the drive units 468 and 472 to expose the entire coil 461 as shown in FIG. 18. The entire coil 461 is heated by the ceiling heater 473, the sidewall heater 474 and the base heater 475. This does not cause any problem, since the coil 461 is heated to a temperature below the specific temperature $\theta_o$, and since the absence of a temperature gradient along the height of the coil does not have any effect on the magnetic properties of the steel. The simultaneous heating of the entire coil enables a reduction in heating time.

Figure 19:
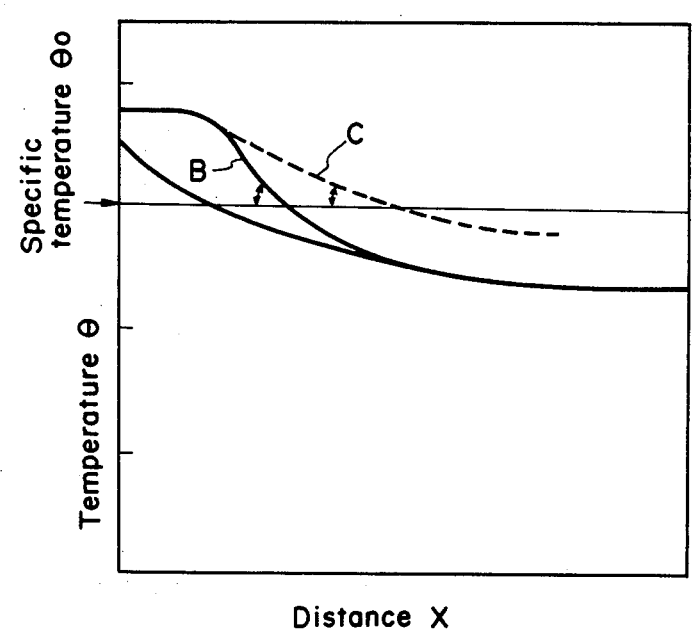
FIG. 19 is a graph showing the temperature distribution obtained along the strip width in the apparatus of FIG. 17.

If the annular and cylindrical structures are raised and have an upper end flush with that of the coil 461, the coil 461 is heated unidirectionally only at its upper end as in EXAMPLE 1. As only the upper end of the coil 461 is heated, a temperature gradient is developed along the height of the coil. Thermocouples or like temperature detectors 477-1 to 477-5 are provided in mutually spaced apart relationship along the height of the coil 461 to detect the temperature of the coil 461 facing the cooling chambers 464 and 469. No such detectors are required, if any such coil temperature can be predicted by employing, for example, an electronic computer. The flow rate of a cooling medium, such as $N_2$ gas, to the cooling chambers 464 and 469 is controlled to increase their cooling power so that the coil temperature in that region may not reach the specific temperature $\theta_o$. A large temperature difference is, thus, developed between the upper end portion of the coil 461 and its lower portion, and a large temperature gradient is defined when the lower portion of the coil 461 passes the specific temperature. The temperature distribution thus achieved along the height of the coil is shown by a curve B in FIG. 19. If there were no cooling chamber 464 or 469, excessive heat would be transmitted to the whole region having a temperature kept slightly below the specific temperature range, resulting in an excessive rise in temperature of the coil as a whole, and a temperature distribution curve C along the height of the coil as shown in FIG. 19. As is obvious from FIG. 19, a temperature gradient defined by the curve B at the specific temperature $\theta_o$ is greater than that defined by the curve C.

Then, the annular and cylindrical structures are lowered to expose the upper end portion of the coil 461, and a second supply of heat is applied laterally to the inner and outer peripheral surfaces of the exposed coil portion, as in EXAMPLE 1. As a result, that portion of the coil rises in temperature rapidly, while the cooling chambers 464 and 469 cool the lower portion of the coil 461 so that it may not reach the specific temperature $\theta_o$. A temperature gradient is, therefore, created between the upper end portion of the coil and its lower portion. Then, the annular and cylindrical structures are gradually lowered to a further extent to expose a gradually increased portion of the coil 461 until the lower end of the coil passes the specific temperature $\theta_o$, while a large temperature gradient is maintained along the height of the coil. The cooling device 476 is used to cool the lower end of the coil so that its temperature may not exceed the specific temperature as long as the coil is heated laterally. Its operation is, however, discontinued when the lower end of the coil is heated laterally.

EXAMPLE 4

Figure 20:
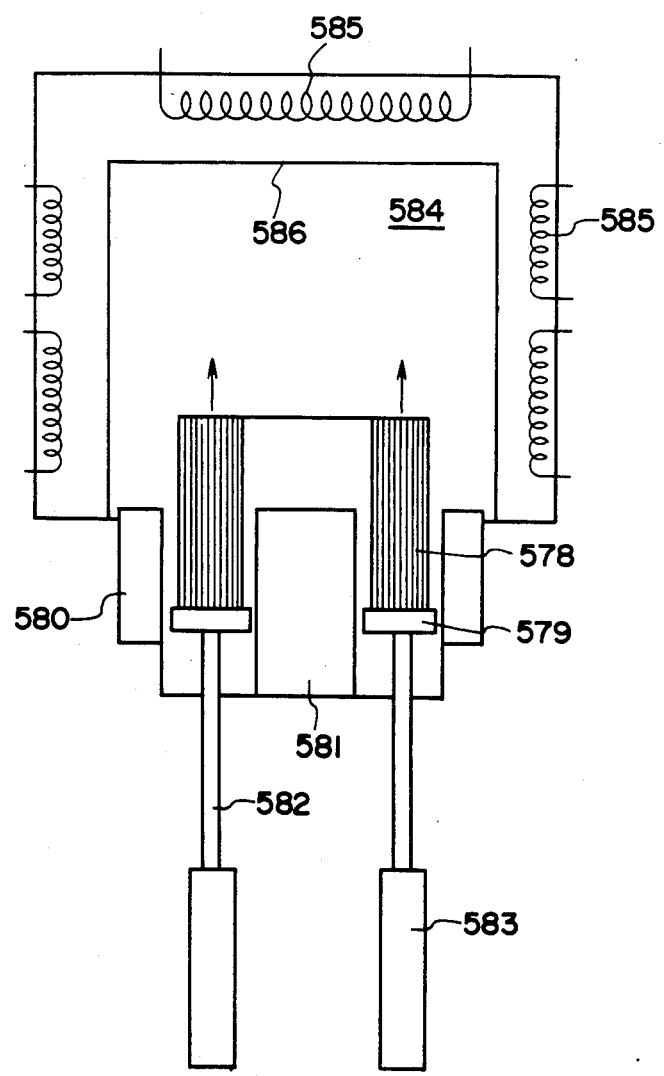
FIG. 20 is a view illustrating a fourth embodiment of this invention.

Referring to FIG. 20, there are shown a coil 578 of a steel strip, and a base plate 579 connected by connecting rods 582 to drive units 583, such as hydraulic pistons. A cylindrical member 581 of heat insulating material is disposed in the central hollow space of the coil 578, and has an outside diameter which is slightly smaller than the inside diameter of the coil. An annular member 580 of heat insulating material encircles the coil, and has an inside diameter which is slightly larger than the outside diameter of the coil. The coil 578 is, thus, vertically movable by the drive units 583 along the heat insulating members 580 and 581. An inner cover 586 defines a heating chamber 584 above the heat insulating members 580 and 581. Heaters 585, such as electric heaters or fuel-fired burners, are provided for the heating chamber 584.

When the heating of the coil 578 is started, its upper end is kept flush with the upper ends of the heat insulating members 580 and 581, and the heating chamber 584 is heated by the heaters 585. The coil 578 is gradually heated unidirectionally at its upper end, and obtains a temperature gradient along its height, as in EXAMPLE 1. If the upper end of the coil has reached the specific temperature, the coil is raised by the drive units 583 into the heating chamber 584 so that its inner and outer peripheral surfaces may be heated. The coil portion exposed to the heating chamber 584 rises in temperature rapidly, and due to its large difference in temperature from the lower portion of the coil, it creates a large temperature gradient at a point where it passes the specific temperature. The coil 578 is gradually raised to a further extent. This operation is different from the operation of EXAMPLE 1 in which the heat insulating members are gradually lowered to effect the lateral heating of the coil, but is equal thereto from the standpoint of coil heating. It is obvious that the process according to this example provides a large temperature gradient for the coil portion passing the specific temperature, and thereby produces a coil having excellent magnetic properties as a whole.

EXAMPLE 5

Figure 21:
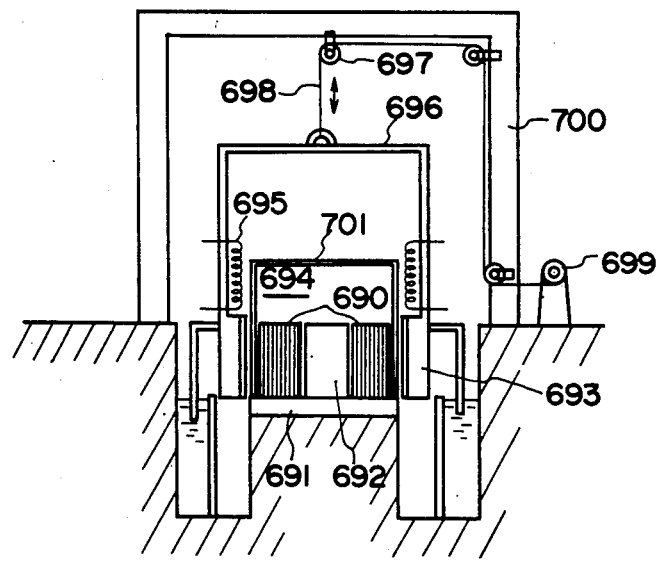
FIGS. 21(a) and 21(b) illustrate a fifth embodiment of this invention.
Figure 21:
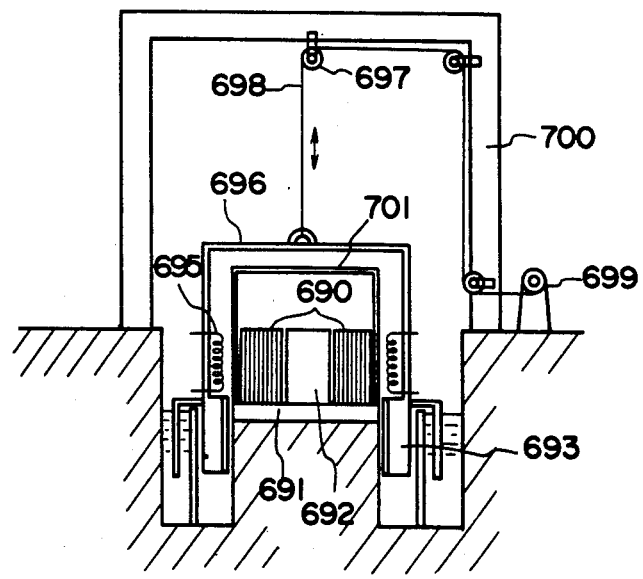

Referring now to FIGS. 21(a) and 21(b), there are shown a coil 690 of a strip, a base plate 691, and a cylindrical chamber 692 of heat insulating material disposed in the central hollow space of the coil. A heat insulating wall 693 contains an inner cover 701, and has an inside diameter which is slightly larger than the outside diameter of the coil 690. A furnace body or outer cover 696 defines a heating chamber 694 therein, and a heater 695 is provided for the heating chamber 694. The wall 693 and the heater 695 are joined to the sidewall of the furnace body 696. The furnace body 696 is vertically movable by a rope 698 extending between the top of the furnace body and a winch 699 via a set of pulleys 697 supported on an arch crane 700.

When the heating of the coil is started, its upper end is kept flush with that of the wall 693, and the coil 690 is heated unidirectionally only at its upper end as in EXAMPLES 1 and 4, since the heat insulating wall 693 stays in close proximity to the outer peripheral surface of the coil. If the upper end of the coil has reached the specific temperature, the furnace body 696 is gradually lowered as shown in FIG. 21(b). The outer surfaces of the coil are exposed to the heating chamber 694, and heated so that a large temperature gradient may be created along the height of the coil as in EXAMPLES 1 and 4 to enable the production of a coil having desired magnetic properties.

According to the several examples of this invention, as hereinabove described, the combination of unidirectional heating, lateral heating and cooling for the finish annealing of a coil of an electromagnetic steel strip enables the development of a large temperature gradient in a short time along the width of the strip when any portion of the coil passes a specific temperature, and thereby enables the production of a grain-oriented electromagnetic steel strip or sheet having greatly improved magnetic properties.

Although the invention has hereinabove been described for heating a coiled steel strip, it is equally applicable to a stack of steel sheets.

According to the first and second aspects of this invention, heat is supplied to a coiled steel strip or a stack of steel sheets by transfer from a source of heat. This method is, however, not always advantageous in productivity, since its productivity depends on the efficiency of heat transfer.

This problem is solved by a third aspect of this invention which ensures drastically improved productivity. According to the third aspect of this invention, at least one pair of transverse flux inductors are employed to heat by induction the inner and outer peripheral surfaces of a coiled steel strip or the front and rear surfaces of a stack of steel sheets, and a heating zone created on the coil or stack is moved to enable any portion of the coil or stack along its width or length to pass with a predetermined temperature gradient through the boundary between the temperature ranges for primary and secondary recrystallization.

Figure 22:
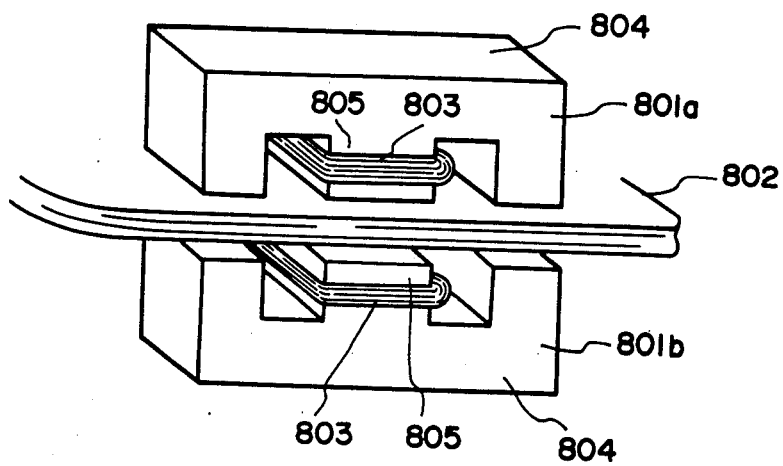
FIG. 22 is a view showing a stack of steel sheets disposed between a pair of transverse flux inductors.

This aspect of the invention will now be described more specifically with reference to the drawings. Referring first to FIG. 22, there are shown a pair of transverse flux inductors 801a and 801b facing the front and rear sides, respectively, of a stack 802 of steel sheets. Each of the inductors 801a and 801b comprises a coil 803 wound on the central leg 805 of an iron core 804. The inductors 801a and 801b produce a magnetic flux in a direction perpendicular to the thickness of the stack 802 at a speed which depends on the frequency of a power source for energization. As a result, an eddy current is induced in the stack 802, and it is heated by Joule heat.

Figure 23:
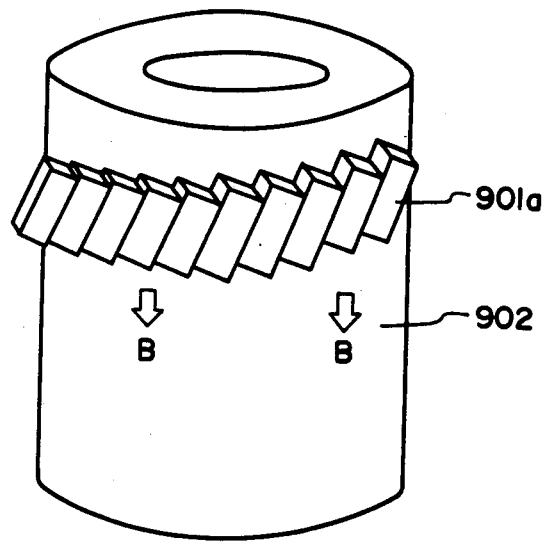
FIG. 23 shows an arrangement in which a pair of groups of small transverse flux inductors are disposed in mutually close relationship around the inner and outer peripheries of a coiled strip.

It is possible to employ only one inductor to heat the stack 802 only on one side thereof if its thickness is small. When induction heating is employed, however, the entire stack 802 is not heated uniformly, since the most intense heat is produced about the flux. This tendency increases if a larger inductor is used to heat a thicker stack of sheets efficiently. In order to overcome this problem, this invention employs a pair of groups of small inductors 901a and 901b (not shown) disposed in mutually close relationship around the outer and inner surfaces of a coil 902 of a steel strip to apply a uniform supply of heat to the coil along its inner and outer circumferences, as shown in FIG. 23.

Figure 24:
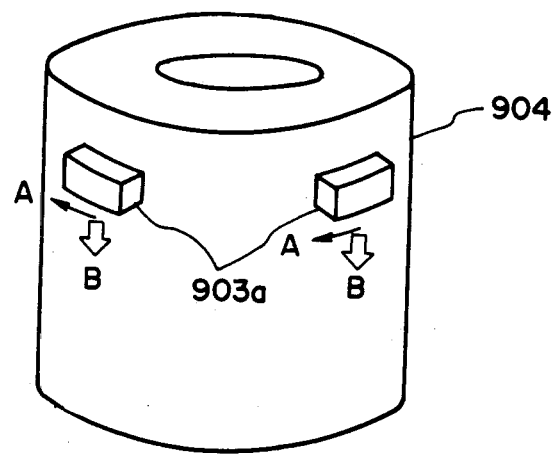
FIG. 24 shows an arrangement in which a pair of groups of small transverse flux inductors are disposed in mutually spaced apart relationship around the inner and outer peripheries of a coiled strip.

A more effective method is, however, shown in FIG. 24. A pair of groups of small inductors 903a and 903b (not shown) are disposed in mutually spaced apart relationship on the outer and inner surfaces, respectively, of a coil 904 of a steel strip. The inductors and the coil are movable relative to each other around the circumference of the coil. For example, the coil 904 is fixed, and the inductors 903a and 903b are movable in the direction of an arrow A to heat the coil uniformly along its circumferences.

The uniform heating of the coil around its circumferences creates a temperature gradient between the heated portion of the coil and its remaining portion to thereby establish the conditions required for recrystallization. With the progress of secondary recrystallization, the inductors may be moved along the width of the strip in the direction of arrows B in FIG. 23 or 24 to accomplish the heat treatment of the coil along its entire height.

The heating rate can be controlled mainly by the temperature elevation required for heating the coil, and its temperature gradient mainly by the heating zone available by the inductors. For example, if a coil preheated to 800° C. is heated to 1,000° C., and has an average diameter of 1,000 mm and a wall thickness of 100 mm, while the inductors are movable at a rate of 600 mm per hour, it is sufficient to supply an effective heat of about 60,000 kcal. per hour to the coil. If the inductors produce a heating zone having a width of 100 mm, the coil is heated at a heating rate of 1,200° C. per hour with an average temperature gradient of 20° C. per centimeter.

Figure 25:
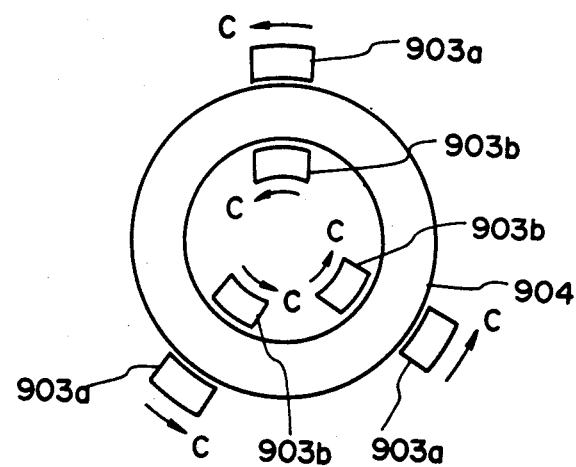
FIG. 25 is a top plan view of the arrangement shown in FIG. 24.

In the arrangement of FIG. 24, an electromagnetic force acts between the coil and the inductors if the coil is magnetic. If the coil and the inductors are moved relative to each other only in one direction, the coil is disadvantageously tightened or loosened. In order to overcome this disadvantage, it is effective to vary the direction of the relative movement of the inductors 903a and 903b appropriately as shown by arrows C in FIG. 25. The electromagnetic force acting between the coil and the inductors varies with the distance therebetween. This distance also has a bearing on the efficiency of induction heating. Accordingly, it is important for the stability of operation to maintain the distance at a proper level. It is practically appropriate to select a support for the inductors based on the surfaces of the coil and maintain a constant distance between the coil and the inductors against any electromagnetic force acting therebetween.

Although induction heating can, of course, be used to heat a coil or stack from ordinary room temperature, it is advisable to employ it only for heating the coil or stack in a temperature range including recrystallization temperatures, for example, from 800° C. to 1,000° C., while gas or other means is used to heat the coil or stack to that temperature range. This method is practically useful in view of not only the cost of heat, but also the efficiency of use of the apparatus.

Figure 26:
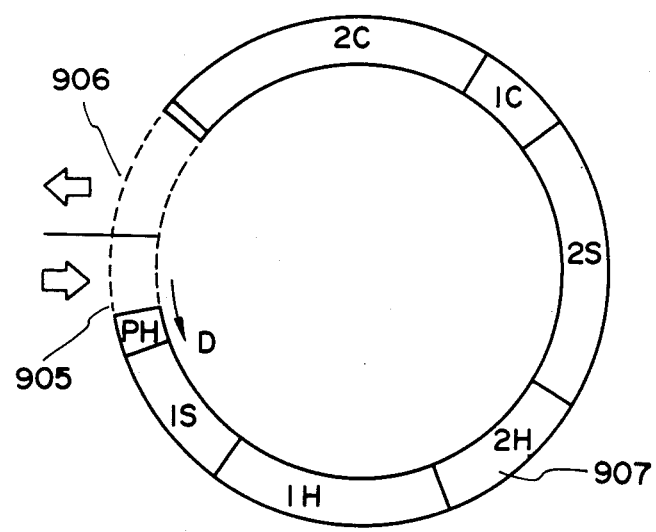
FIG. 26 is a view illustrating an application of this invention to heat treatment by a rotary furnace.

FIG. 26 illustrates the application of this invention to heat treatment by a rotary furnace. A coil 906 of a steel strip is introduced into the furnace through an entrance 905, and moved in the direction of arrow D so that it may be preheated at PH, subjected to primary soaking at 1S, and subjected to primary heating at 1H. The coil thus heated to a prescribed temperature is moved into a zone 907 for secondary recrystallization annealing according to this invention. Then, the coil passes through a secondary soaking zone 2S, a primary cooling zone 1C and a secondary cooling zone 2C, and is discharged through an exit 906. The application of this invention to the heat treatment of the coil in a specific temperature range is very advantageous for the efficient utilization of the entire equipment. The same concept is, of course, equally applicable to the heat treatment of steel sheets.

Figure 27:
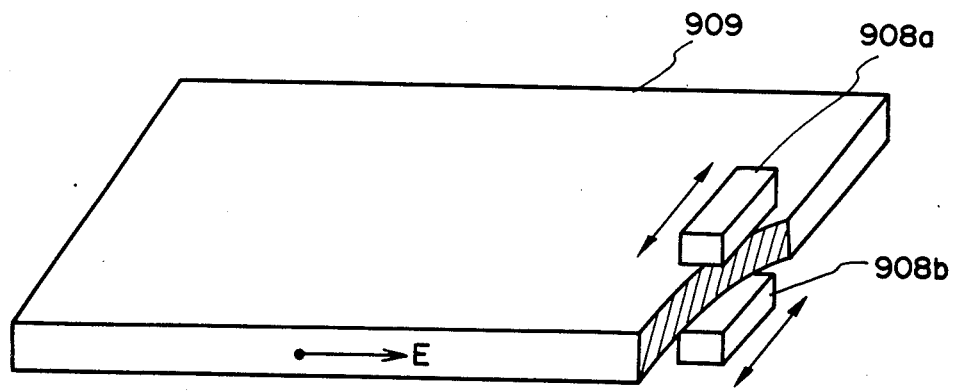
FIG. 27 is a view illustrating an application of this invention to the heat treatment of a stack of steel sheets.

FIG. 27 illustrates by way of example the application of this invention to the heat treatment of a stack of steel sheets. The stack 909 is moved longitudinally in the direction of arrow E at a speed which depends on the growth of crystals. A pair of inductors 908a and 908b are reciprocated in a direction perpendicular to the direction of movement of the stack 909 at a speed which ensures that only a negligible temperature difference be created along the width of the stack 909. Of course, it is alternatively possible to dispose a plurality of fixed inductors in mutually close relationship along the width of the stack 909.

According to this invention, it is possible to achieve a speed of heat treatment which is about 10 times greater than that which is available in the prior art. According to the prior art, only a speed of, say, 25 mm per hour is available for the predetermined heat treatment of a steel strip or sheet along its entire width in the event it is heated unidirectionally from an external source of heat, and only a speed of, say, 50 mm per hour in the event it is heated bidirectionally. On the other hand, this invention enables a speed of, say, 1 cm per minute, or 600 mm per hour. This improvement in the speed of heat treatment is practically of great importance in view of the economy of the production equipment.

What is claimed is:

1. An apparatus for heat treating a coil of a grain-oriented electromagnetic steel strip, comprising:
   a base plate on which the coil is to be positioned;
   an annular insulator for surrounding the outer peripheral surface of the coil in slightly spaced apart relation therefrom;
   a cylindrical insulator for positioning within the coil in slightly spaced apart relation from the inner peripheral surface of the coil;
   means provided below said base plate for moving the coil or said annular and cylindrical insulators vertically;
   an inner cover for surrounding the coil and said base plate;
   an outer cover surrounding said inner cover;
   heating means for heating the coil; and
   means for cooling the lower end of the coil during its heat treatment;
   said moving means being adapted to move the coil or said insulators vertically so that a temperature gradient of at least 2° C./cm may be established along the height of the coil being heat treated.

2. An apparatus as set forth in claim 1, wherein said moving means comprises a mechanism for moving said annular and cylindrical insulators vertically along the height of the coil, while the coil is fixed.

3. An apparatus as set forth in claim 1, wherein said moving means comprises a mechanism for moving the coil along said annular and cylindrical insulators, while said insulators are fixed.

* * * * *